Sept. 4, 1945.  E. O. SCHWEITZER, JR  2,384,348
NAVIGATIONAL APPARATUS
Filed Dec. 9, 1943   5 Sheets-Sheet 1

Support carried by Vehicle
Gyroscopically controlled

INVENTOR
Edmund O. Schweitzer, Jr.

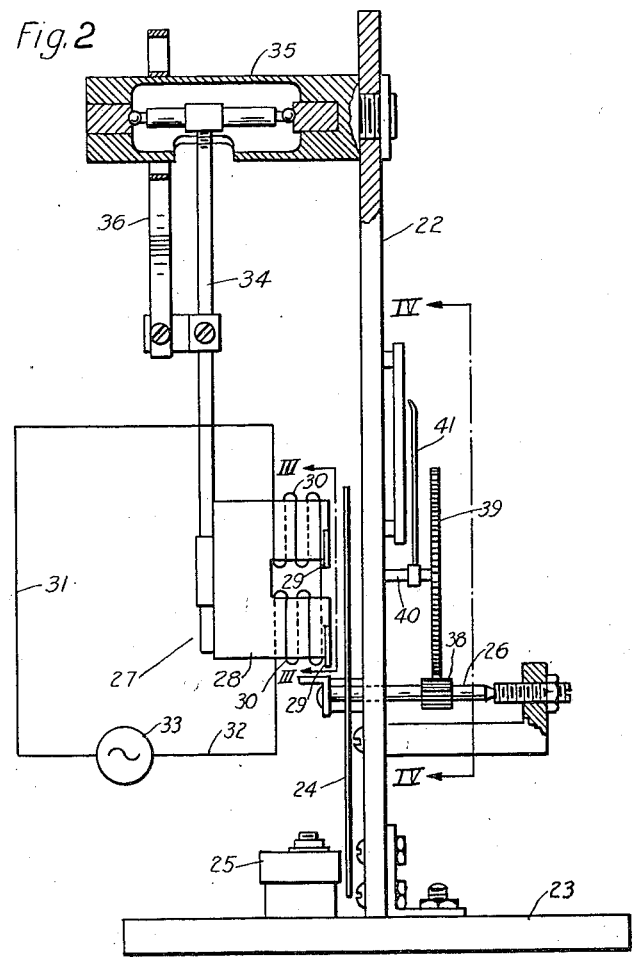
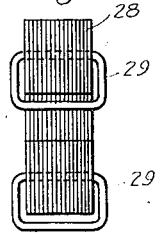
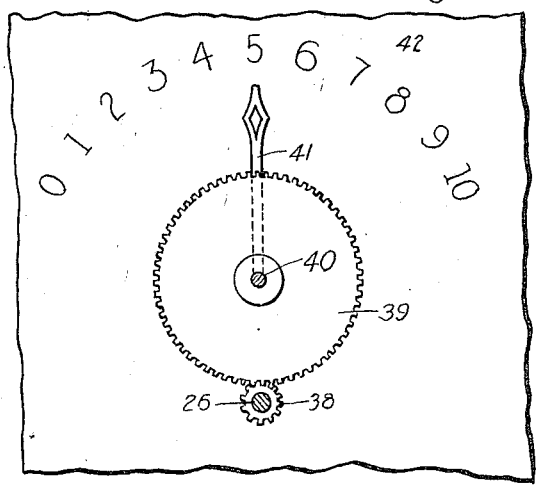

Sept. 4, 1945.  E. O. SCHWEITZER, JR  2,384,348
NAVIGATIONAL APPARATUS
Filed Dec. 9, 1943  5 Sheets-Sheet 3

INVENTOR
Edmund O. Schweitzer, Jr.

Sept. 4, 1945.  E. O. SCHWEITZER, JR  2,384,348
NAVIGATIONAL APPARATUS
Filed Dec. 9, 1943  5 Sheets-Sheet 4
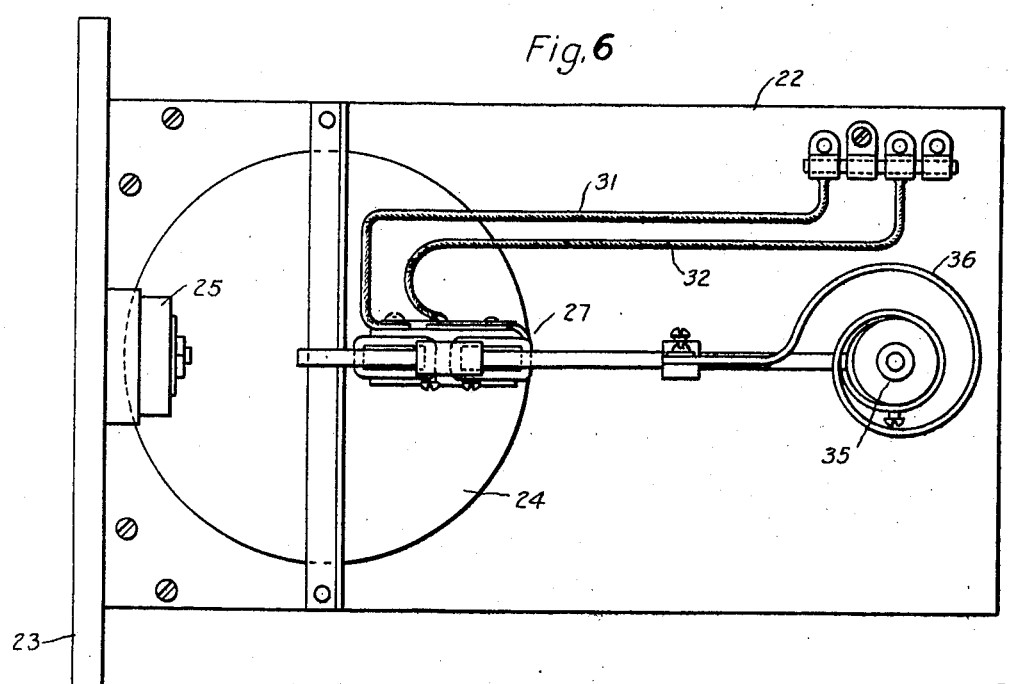
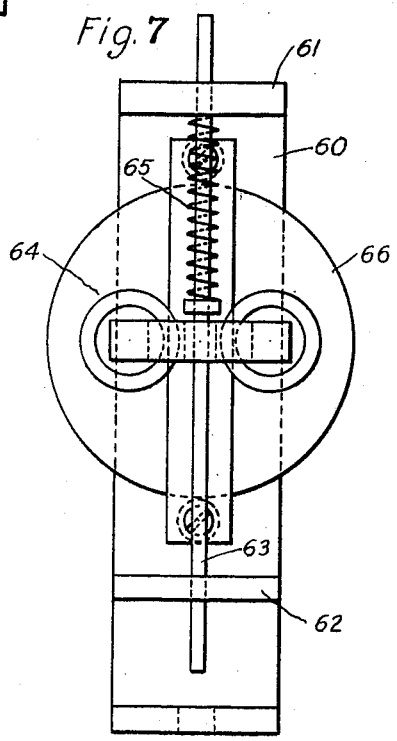 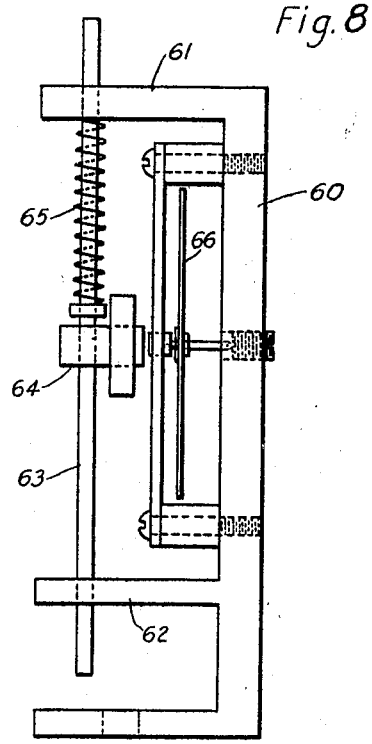
INVENTOR
Edmund O. Schweitzer, jr.

Sept. 4, 1945.    E. O. SCHWEITZER, JR    2,384,348
NAVIGATIONAL APPARATUS
Filed Dec. 9, 1943    5 Sheets-Sheet 5
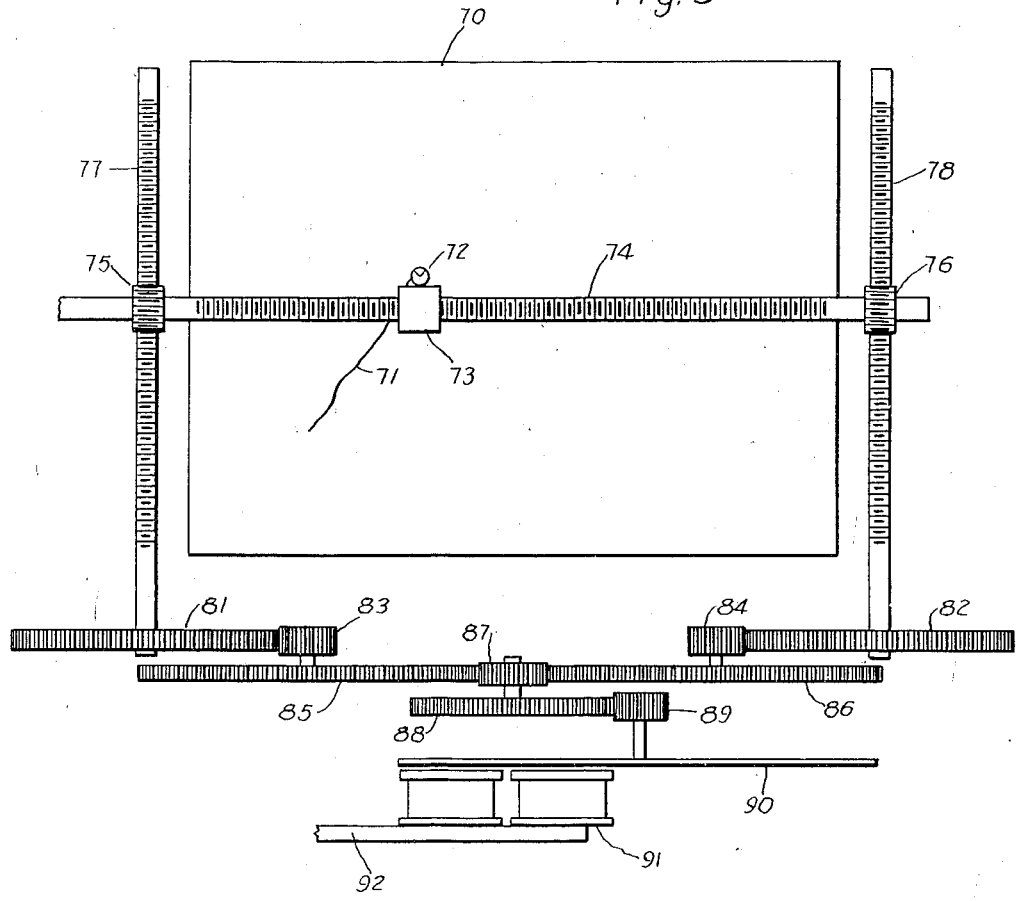
INVENTOR
Edmund O. Schweitzer, Jr.

Patented Sept. 4, 1945

2,384,348

UNITED STATES PATENT OFFICE 2,384,348

NAVIGATIONAL APPARATUS

Edmund O. Schweitzer, Jr., Northbrook, Ill.

Application December 9, 1943, Serial No. 513,534

7 Claims. (Cl. 73—178)

My invention relates generally to measuring apparatus and it has particular relation to apparatus for measuring the velocity of a vehicle, such as an automobile, ship or airplane, and for measuring the distance travelled by the same.

In aerial navigation, as well as in travel over land and over water, instrument control is of primary importance to show the various factors essential to the successful operation of the vehicle of transportation. Failure in performance, particularly in the case of the aeroplane, has resulted in disaster. While great improvements have been made in the construction of aeroplanes all of these developments finally depend upon the functioning of the instruments mounted in the plane itself. While these instruments have also been improved, these improvements have largely been made upon details of construction where often this practice has resulted in refinements upon somewhat inadequate elementary bases or principles.

I have found that it is possible to utilize Newton's laws of motion in the design of an instrument that is new in principle of operation and which, in my opinion, will result in greater safety of aerial navigation due to accuracy and reliability of operation of the instrument invented by me.

I have found superior means of measuring the velocity and distance that a vehicle travels and this, utilizing a new method and means for such accomplishment.

Utilizng Newton's laws of motion and certain well known relationships respecting the derivation of velocity and distance traversed by a vehicle, it is possible to formulate certain equations which are the basis for the operation of my invention as herein disclosed. Accordingly, there is set forth the following:

1. $v = ds/dt$
2. $a = dv/dt$
3. $f = ma$ or $a = f/m$ from (2) and (3)
4. $dv/dt = f/m$ solving for $v$
5. $v = 1/m \int f dt + c$ from (1)
6. $dv/dt = d^2s/dt^2$ from (2) and (6)
7. $d^2s/dt^2 = a$ from (3) and (7)
8. $d^2s/dt^2 = f/m$ solving for $s$
9. $s = 1/m \iint f dt^2$ $v$ = velocity
$s$ = distance
$t$ = time
$a$ = acceleration
$m$ = mass
$f$ = force Various means can be employed to perform the integrations set forth in Equations 5 and 9 above. For example, curve tracing instruments may be employed.

An object of my invention is to provide for measuring the velocity of a vehicle without providing any coupling means between the vehicle and the medium in which or on which it travels.

A further object of my invention is to provide for mechanically integrating the acceleration of a vehicle with reference to time to measure the velocity of the vehicle.

Another object of my invention is to provide for mechanically integrating the velocity of a vehicle with reference to time to measure the distance travelled by the vehicle.

Other objects of my invention will, in part, be obvious and, in part, appear hereinafter.

For a more complete understanding of the scope of my invention, reference can be had to the following detailed description, taken in connection with the accompanying drawings forming a part thereof, and in which:

Fig. 2 is a view, in side elevation, of the apparatus shown in Fig. 1, certain parts being broken away in order to illustrate more clearly the details of construction;

Fig. 3 is a detail sectional view taken along the lines III—III of Fig. 2;

Fig. 4 is a detail sectional view taken along the line IV—IV of Fig. 2;

Fig. 6 is a view similar to Fig. 1, but shows the integrating apparatus mounted for measuring velocity in a vertical plane;

Fig. 7 is a view in front elevation of another modification of the integrating apparatus;

Fig. 8 is a view in side elevation of the integrating apparatus shown in Fig. 7; and Fig. 9 is a view in top plan of apparatus for drawing a line on a chart employing the integrating apparatus of the present invention.

Figure 1:
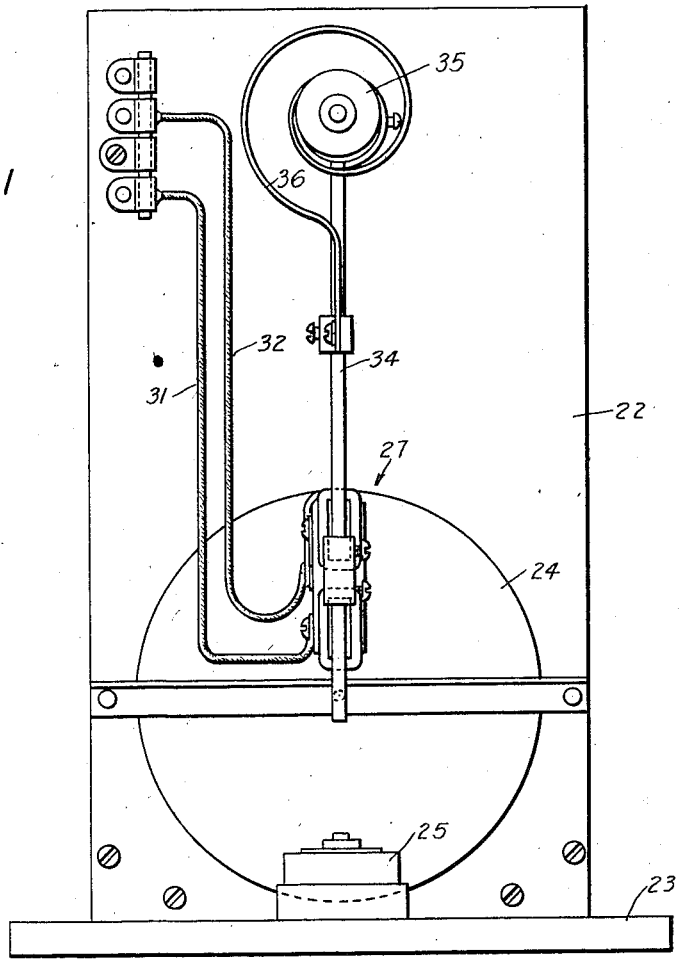
Fig. 1 is a view, in rear elevation, of one embodiment of my invention by means of which the integration is mechanically performed.

Reference is now made to Figs. 1, 2, 3, and 4 of the drawings where mechanical integrating means is disclosed. It will be noted that the reference character 22 designates a suitable panel or plate which may be formed either of metal or insulating material. It is carried on a suitable support 23 that in turn is mounted on the vehicle and is maintained in a given plane by gyroscopically controlled means.

Rotatably mounted on the panel 22 is a disk 24 of conducting material, such as aluminum. A damping magnet 25 is provided for damping the movement of the disk 24 in the same manner that the disk of a Watt-hour meter is damped.

As shown in Fig. 2 the disk 24 is mounted on a shaft 26 which is suitably journaled.

With a view to providing for rotating the disk 24, there is mounted an electromagnet shown generally at 27. The electromagnet 27 comprises a C-shaped core 28 of suitable laminated magnetic material. Shading rings or coils 29 are provided in the pole faces as shown more clearly in Fig. 3 for the purpose of creating a shifting magnetic field when windings 30 are energized. The windings 30 are connected by conductors 31 and 32 for energization to a suitable source 33 of alternating current, such as 110-volt 60-cycle source. It will be understood that when the windings 30 are energized, a shifting magnetic field will be generated and that when the electromagnet 27 is in the position shown in Fig. 1 of the drawings, the shift will be in a direction that is radial with respect to the disk 24. Consequently, when the electromagnet 27 occupies the position shown in Fig. 1 and the windings 30 are energized, there will be no torque applied to the disk 24. As a result, it will remain stationary.

The electromagnet 27 is mounted on the lower end of the arm 34 which is pivotally mounted at its upper end, as shown more clearly in Fig. 2 of the drawings, in a suitable bearing mounting 35, that is carried by the plate or panel 22. A coil spring 36 interconnects the support 34 and the bearing mounting 35 and serves to center the support 34 and electromagnet 27 carried thereby in the position shown in Fig. 1 of the drawings. It will be understood that the electromagnet 27 and support 34 constitute a pendulum. The position of the pendulum depends upon the direction and magnitude of acceleration of the vehicle in which the device is mounted. Accordingly, the pendulum will swing to the left if the vehicle moves to the right because of Newton's laws of motion that a body tends to remain in a state of rest or motion until acted upon by a force tending to change that state. Likewise, if the movement of the vehicle is in a reverse direction the pendulum would swing to the right.

As soon as the electromagnet 27 moves away from the position shown in Fig. 1 of the drawings, the shifting field created thereby is no longer radially disposed with respect to the disk 24. Rather it is so disposed as to create a driving torque in the disk 24 by the interaction between the magnetic field and the eddy current induced in the disk 24. Accordingly, the disk 24 will rotate through an extent depending upon the magnitude of displacement of the electromagnet 27 from the center position and also in accordance with the time of displacement thereof. It follows that the extent of movement of the disk 24 is a measure of the velocity of the vehicle in one direction and that the disk 24 mechanically performs the integration set forth in Equation 5 above.

It is only necessary then to provide for indicating the displacement of the disk 24 to show the actual velocity of the vehicle. For this purpose a pinion 38 is mounted on shaft 26 and is arranged to drive a gear wheel 39 carried by a rotatably mounted shaft 40.

The shaft 40 carries a pointer 41 which, as shown more clearly in Fig. 4 of the drawings, is arranged to move relative to a suitable scale 42. The position of the pointer 41 with reference to the scale 42 then indicates the velocity of the vehicle at a given instant. It will be understood, of course, that the scale 42 can be suitably calibrated as desired.

While it is desirable to note the velocity of the vehicle, it is equally important, if not more so, to measure the distance traversed by the vehicle. To obtain the distance traversed it is merely necessary to provide means for integrating velocity with respect to time.

Figure 5:
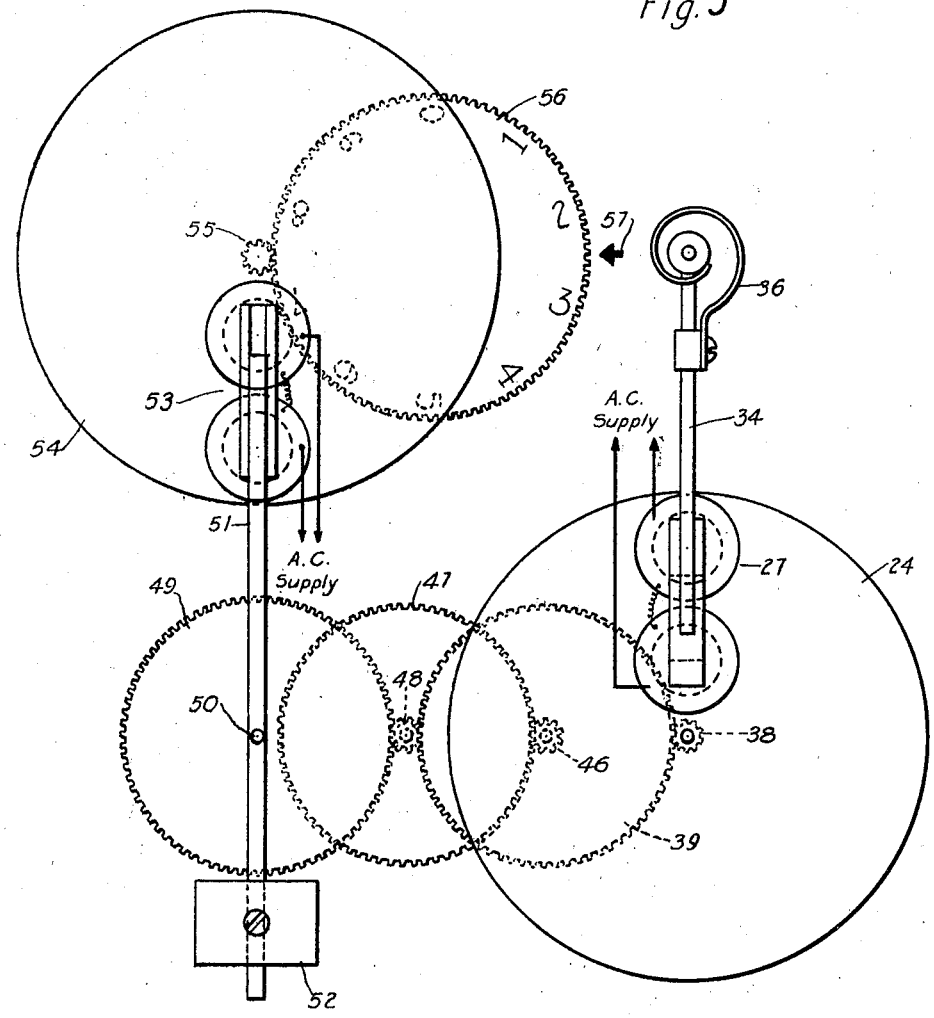
Fig. 5 is a view, somewhat diagrammatic in character, showing how a second integration can be performed after the first integration has been made.

For this purpose the apparatus shown in Fig. 5 can be employed. It will be observed that the disk 24 and electromagnet 27, previously described, are again used. In addition the pinion 38 and gear wheel 39 are employed. However, instead of attaching a pointer to move with the gear wheel 39, it is arranged to drive a pinion 46 which in turn drives a gear wheel 47. The gear wheel 47 drives a pinion 48 which in turn drives a gear wheel 49. The gear wheel 49 is mounted on a shaft 50 and has mounted therewith an arm 51. It will be understood that the arm 51 and gear wheel 49 move together as a unit.

A counter-poise 52 is provided on the lower end of the arm 51 to counterbalance an electromagnet 53 carried at the upper end of the arm 51. The counter-poise 52 is provided to render the position of the arm 51 insensitive to change in acceleration of the vehicle.

The electromagnet 53 can be a duplicate of the electromagnet 27 previously described. The electromagnet 53 is mounted for movement with reference to a disk 54 of conducting material. The disk 54 drives a pinion 55 which in turn drives a gear wheel 56. As shown, the gear wheel 56 may be provided with a scale which moves relative to a stationary index 57.

As previously described, the movement of the disk 24 corresponds to the velocity of the vehicle. By translating the movement of the disk 24 into movement of the electromagnet 53, the disk 54 is caused to move in accordance with the velocity and duration thereof. Consequently, the disk 54 performs the integration set forth in equation 9 above. It is then possible by noting the position of the scale on the gear wheel 56 with reference to the index 57 to obtain an indication of the distance which the vehicle has travelled along a given direction.

To obtain distance travelled along a line at right angles to the first mentioned line, it is only necessary to provide a duplicate of the measuring means shown in Fig. 5 and to mount the same at right angles to the first measuring means. Then noting the distance travelled in two directions at right angles to each in a horizontal plane, it is a simple matter to combine these indications so as to obtain an indication of the actual distance travelled in the plane. As will be set forth hereinafter, suitable means can be provided for drawing a line on a chart to indicate the movement of the vehicle in a plane.

Reference is now made to Fig. 6 of the drawings. It will be noted that the integrating apparatus there shown is a duplicate of the apparatus shown in Fig. 1, but that it is shown in a plane at right angles to the plane of the apparatus shown in Fig. 1. The spring 36 is made of sufficient strength so as to center the electromagnet 27 in the position shown in Fig. 6.

The integrating apparatus shown in Fig. 6 is employed for measuring the velocity of the vehicle in a vertical plane. It is particularly useful in measuring the velocity of ascent or descent of an airplane. Since it functions in a vertical plane in exactly the same manner as the apparatus shown in Fig. 1 operates in a horizontal plane, it is unnecessary to repeat here a description of its function. It is pointed out that suitable gyroscopically controlled means is provided for maintaining the integrating apparatus shown in Fig. 6 responsive only to movement in a vertical direction.

It will now be apparent that three integrating mechanisms such as shown in Fig. 5 of the drawings can be arranged in three planes at right angles to each other, to measure distance travelled in each plane. If desired these distances can be combined so as to obtain a resultant which will indicate the actual distance travelled by the vehicle in three dimensions.

Reference is now made to Figs. 7 and 8 of the drawings. The integrating apparatus there shown is a modification of the integrating apparatus shown in Fig. 1 of the drawings. It includes a supporting frame 60 having uprights 61 and 62 extending therefrom. A rod 63 is carried by the uprights 61 and 62 and it has slidably mounted thereon an electromagnet 64 which is similar to the electromagnet 27 previously described. A coil spring 65 surrounding the rod 63 and extending between the upright 61 and the electromagnet 64 serves to normally maintain the latter in a neutral position with respect to a metallic disk 66.

When the apparatus shown in Figs. 7 and 8 is employed for measuring the velocity in a vertical plane, it will be understood that when the vehicle accelerates upwardly the electromagnet 64 will move downwardly along the rod 63 in accordance with Newton's laws of motion. In so doing it will move from the neutral position shown in the drawings to a position where the shifting field will cause the disk 66 to rotate to integrate the acceleration with respect to time. It will then be understood that suitable means could be used for indicating the extent of rotation of the disk 66, such as that shown in Fig. 4.

Reference is now made to Fig. 9 of the drawings. The reference character 70 designates a chart or map, or it can be a blank sheet of paper. The purpose of the apparatus there shown is to draw a line 71 on the chart 70 which will represent the course that the vehicle has followed from the beginning of the journey to any particular time during the journey.

The line 71 is drawn by suitable means as the pen 72 that is carried by a nut 73 threaded on a shaft 74. The shaft 74 is mounted at its ends by nuts 75 and 76 which, in turn, are threadably mounted on shafts 77 and 78.

The shaft 74 is arranged to be driven by east-west distance measuring apparatus such as shown in Fig. 5 of the drawings, so mounted that the electromagnet 27 responds to acceleration in an east-west direction. It will then be understood that the position of the nut 73 and the pen 72 carried thereby will be controlled in accordance with the distance that the vehicle has travelled along the east-west direction.

It will be noted that the shafts 77 and 78 are arranged to be driven in a north-south direction and are provided respectively with gear wheels 81 and 82 which mesh with pinions 83 and 84. These pinions are driven through gear wheels 85 and 86 respectively, which mesh with a common pinion 87, that is driven through gear wheel 88 and pinion 89 by a disk 90; the disk 90 corresponding to the disk 54 shown in Fig. 5 of the drawings. The position of the disk 90 is controlled by an electromagnet 91 similar to the electromagnet 53, that is mounted on an arm 92 similar to the arm 51. It will be understood that the electromagnet here employed, corresponding to the electromagnet 27, responds to acceleration in a north-south direction.

It will now be apparent that the position of the shaft 74 relative to the shafts 77, 78, will be controlled in accordance with the movement of the disk 90. As the result, the component of distance travelled in the north-south direction is fed into the apparatus and results in corresponding movement of the pen 72.

It will be further understood that the east-west and north-south distance measuring apparatus will be maintained level and in a fixed direction in space by suitable means.

It will now be apparent that it is merely necessary to start the pen 72 at a known point on the chart 70. During the travel of the vehicle its course will be faithfully drawn on the chart 70. Therefore, it is only necessary to note the position of the pen 72 to obtain an indication of the exact location of the vehicle on the map or chart 70. The advantages of this are obvious.

Since certain further changes can be made in the foregoing construction and different embodiments of the invention can be made without departing from the spirit and scope thereof, it is intended that all matters shown in the accompanying drawings, and described hereinbefore, shall be interpreted as illustrative and not in a limiting sense.

I claim as my invention:

1. Means for measuring the velocity of a vehicle comprising in combination, support means adapted to be carried by the vehicle, means for generating a shifting magnetic field movably carried by said support means and movable relative thereto from an initial position as a function of the change in velocity of the vehicle, and a conducting member operatively disposed with respect to said field generating means in such manner that in the initial position of the latter the former remains stationary while in other operative positions of said field generating means said member is moved in one direction or the other by said shifting magnetic field in accordance with the change in velocity of the vehicle.

2. Means for measuring the velocity of a vehicle comprising, in combination, support means adapted to be carried by the vehicle, means for generating a shifting magnetic field movably carried by said support means and movable relative thereto from an initial position as a function of the acceleration or deceleration of the vehicle, said field generating means occupying said initial position when the change in speed of the vehicle is zero, a conducting member operatively disposed with respect to said field generating means so that in the initial position thereof the member remains stationary while in other operative positions thereof said member is moved in one direction or the other by said shifting magnetic field depending upon whether the vehicle is accelerating or decelerating, and means for measuring the movement of said conducting member, the extent thereof being proportional to the velocity of the vehicle.

3. Vehicle velocity measuring means comprising, in combination, support means adapted to be carried by the vehicle, a member pivotally mounted on said support means having an initial position corresponding to zero change of velocity of the vehicle and having operative positions each side of its initial position corresponding to the acceleration or deceleration of the vehicle, means for generating a shifting magnetic field carried by said member, and a conducting disc rotatably mounted on said support means and operatively associated with said member and said shifting magnetic field means carried thereby so that when the latter occupies said initial position said disc is stationary, but when displaced therefrom said disc is rotated in accordance with the extent and time of displacement thereof.

4. Vehicle velocity measuring means comprising in combination, support means adapted to be carried by the vehicle, a member pivotally mounted on said support means having an initial position corresponding to zero change of velocity of the vehicle and having operative positions each side of its initial position, corresponding to the acceleration or deceleration of the vehicle, means for generating a shifting magnetic field carried by said member, a conducting disc rotatably mounted on said support means and operatively associated with said member and said shifting magnetic field means carried thereby so that when the latter occupies said initial position said disc is stationary but when displaced therefrom said disc is rotated in accordance with the extent and time of displacement thereof, and means operated by said disc for indicating the extent of rotation thereof whereby a measure of the velocity of the vehicle is provided.

5. Means for measuring the distance traversed by a vehicle comprising, in combination, support means adapted to be carried by the vehicle, means for generating a shifting magnetic field movably carried by said support means and movable relative thereto from an initial position as a function of the change in velocity of the vehicle, a conducting member operatively disposed with respect to said field generating means in such manner that in the initial position of the latter the former remains stationary while in other operative positions of said field generating means said member is moved in one direction or the other by said shifting magnetic field in accordance with the change in velocity of the vehicle, a second means for generating a shifting magnetic field operatively connected to said conducting member and adapted to be moved in accordance therewith, and a second conducting member operatively disposed with respect to said second means in such manner that in the initial position of the latter the former remains stationary while in other operative positions of said second means said second conducting member is moved in one direction or the other by the second mentioned shifting magnetic field in accordance with the extent of movement of the first mentioned conducting member.

6. Means for measuring the distance traversed by a vehicle comprising, in combination, support means adapted to be carried by the vehicle, a member pivotally mounted on said support means having an initial position corresponding to zero change of velocity of the vehicle and having operative positions, each side of its initial position corresponding to the acceleration or deceleration of the vehicle, means for generating a shifting magnetic field carried by said member, a conducting disc rotatably mounted on said support means and operatively associated with said member and said shifting magnetic field means carried thereby so that when the latter occupies said initial position said disc is stationary but when displaced therefrom said disc is rotated in accordance with the extent and time of displacement thereof, a second member operatively connected to said conducting disc and adapted to be moved in accordance therewith, means for generating a shifting magnetic field carried by said second member, and a second conducting disc rotatably mounted and operatively associated with said second member and said shifting magnetic field means carried thereby in such manner that the second disc is rotated in one direction or the other by the second mentioned shifting magnetic field in accordance with the extent of movement of the first mentioned conducting disc.

7. Vehicle velocity measuring means comprising, in combination, support means adapted to be carried by the vehicle, a member slidably mounted on said support means having an initial position corresponding to zero change of velocity of the vehicle and having operative positions each side of its initial position corresponding to the acceleration or deceleration of the vehicle, means for generating a shifting magnetic field carried by said member, and a conducting disc rotatably mounted on said support means and operatively associated with said member and said shifting magnetic field means carried thereby so that when the latter occupies said initial position said disc is stationary but when displaced therefrom said disc is rotated in accordance with the extent and time of displacement thereof.

EDMUND O. SCHWEITZER, JR.